(12) United States Patent
Fransson et al.

(10) Patent No.: US 11,772,165 B2
(45) Date of Patent: Oct. 3, 2023

(54) THREADING INSERT HAVING VARIABLE EDGE ROUNDNESS

(71) Applicant: SANDVIK INTELLECTUAL PROPERTY AB, Sandviken (SE)

(72) Inventors: Hakan Fransson, Gavle (SE); Roger Ahs, Gavle (SE); Peter Nilsson, Tullinge (SE); Nima Zarif Yussefian, Vallingby (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 16/772,008

(22) PCT Filed: Aug. 28, 2018

(86) PCT No.: PCT/EP2018/073064
§ 371 (c)(1),
(2) Date: Jun. 11, 2020

(87) PCT Pub. No.: WO2019/115025
PCT Pub. Date: Jun. 20, 2019

(65) Prior Publication Data
US 2020/0331070 A1 Oct. 22, 2020

(30) Foreign Application Priority Data
Dec. 14, 2017 (EP) .................................... 17207193

(51) Int. Cl.
B23B 27/16 (2006.01)
B23B 27/06 (2006.01)
B23B 27/14 (2006.01)

(52) U.S. Cl.
CPC .......... *B23B 27/065* (2013.01); *B23B 27/145* (2013.01); *B23B 2200/205* (2013.01); *B23B 2220/24* (2013.01); *B23B 2251/04* (2013.01)

(58) Field of Classification Search
CPC ............ B23G 2200/30; B23G 2200/12; B23G 2200/10; B23B 27/065; B23B 27/06; B23B 2200/245; B23B 2200/24
See application file for complete search history.

(56) References Cited

U.S. PATENT DOCUMENTS

| 5,709,587 A | 1/1998 | Shaffer |
| 2011/0135414 A1 | 6/2011 | Pfeiffer et al. |
| 2017/0274500 A1 | 9/2017 | Rivers |

FOREIGN PATENT DOCUMENTS

| CN | 103464796 A | 12/2013 |
| EP | 0804313 B1 | 4/2002 |
| EP | 2583780 A1 | 4/2013 |

(Continued)

OTHER PUBLICATIONS

English translation of WO 2017073590 (Year: 2017).*

*Primary Examiner* — Alan Snyder
(74) *Attorney, Agent, or Firm* — Corinne R. Gorski (57) ABSTRACT

A threading insert includes a top surface, an opposite bottom surface, a side surface connecting the top surface and the bottom surface, and a first tooth. The first tooth has a first cutting edge, the first cutting edge including a first top cutting edge connecting a first leading cutting edge and a first trailing cutting edge. The first cutting edge has an edge roundness and the size of the edge roundness varies along the first cutting edge.

17 Claims, 6 Drawing Sheets

(56) References Cited

FOREIGN PATENT DOCUMENTS

| EP | 2952277 A1 | 12/2015 | | |
|---|---|---|---|---|
| JP | 2004338048 A | 12/2004 | | |
| JP | 2014091168 A | 5/2014 | | |
| JP | 2017024087 A | 2/2017 | | |
| WO | 2011105098 A1 | 9/2011 | | |
| WO | WO-2011105098 A1 * | 9/2011 | ........... | B23B 27/065 |
| WO | 2012023325 A1 | 2/2012 | | |
| WO | WO-2017073590 A1 * | 5/2017 | ............. | B23B 27/14 |

* cited by examiner

THREADING INSERT HAVING VARIABLE EDGE ROUNDNESS

RELATED APPLICATION DATA

This application is a § 371 National Stage Application of PCT International Application No. PCT/EP2018/073075 filed Aug. 28, 2018 claiming priority to U.S. 62/565,181 filed Sep. 29, 2017.

TECHNICAL FIELD OF THE INVENTION

The present invention belongs to the technical field of metal cutting. More specifically the present invention belongs to the field of threading inserts used for metal cutting in machines such as CNC-machines, in particular for threading where a work piece rotates around a center axis thereof.

BACKGROUND OF THE INVENTION AND PRIOR ART

The present invention refers to a threading insert which comprises a top surface, an opposite bottom surface, a side surface connecting the top surface and the bottom surface, a first tooth, the first tooth comprising a first cutting edge, the first cutting edge comprising a first top cutting edge connecting a first leading cutting edge and a first trailing cutting edge. Such a threading insert is disclosed in EP0804313B1.

Many metal components comprise a thread or a thread profile, which is manufactured through a treading process. Thread profiles may have various shapes. Threads may be produced in one or more passes, through which material is removed from a metal work piece. Many threading methods exists for threading using multiple passes, such as radial infeed, flank infeed, modified flank infeed and incremental infeed. Threading methods exists where more than one tooth are simultaneously active. In such a way, one tooth may remove a portion of material, while a second tooth remove further material and generate a final shape of a thread profile.

In threading, there is a need for reduced wear for the cutting insert used. Further, there is a need for improving the surface quality of the thread profile.

SUMMARY OF THE INVENTION

In threading operations there is a need for longer tool life and higher quality of the machined thread profile. Surface quality is improved if the risk of vibrations and cutting forces are reduced. It is advantageous if the threading insert can be manufactured in an economical manner, preferably without any grinding of chamfers along the cutting edges of the threading insert.

At least one of the above objects is achieved by a the above described threading insert where the first cutting edge has an edge roundness when seen in a cross section in a plane perpendicular to the first cutting edge, and where the size of the edge roundness varies along the first cutting edge.

In many types of threading operations and/or when using many types of threading inserts, the amount of material removed by different cutting edge portions of the active tooth vary. By the above defined threading insert, it has been found that by varying the edge roundness along the first cutting edge, the edge strength and the cutting forces generated can be chosen in an optimal manner.

In other words, by the above defined threading insert, a thread profile can be made more efficiently, in terms of reduced insert wear and/or enhanced surface finish and/or less vibration tendencies, and possibly also in terms of chip breaking.

In numerous types of threading operations, at least one of the above functions is improved or enhanced.

For example, if the edge roundness along the first cutting edge varies such that a first leading cutting edge roundness is greater than that a first trailing cutting edge roundness, an improvement is achieved for e.g. a so-called single-point threading insert (a threading insert having one active tooth) when used in a modified flank infeed operation.

A further example, if the edge roundness along the first cutting edge varies such that a first leading cutting edge roundness and first trailing cutting edge roundness each are smaller than that a first top cutting edge roundness, an improvement is achieved. The inventors have found that especially when the radial cutting depth is greater than the axial cutting depth, it is advantageous, especially with regards to reduced wear, to have a greater edge roundness for the first top cutting edge compared to the first leading and trailing cutting edges.

Said improvement is for e.g. a so-called single-point threading inserts (a threading insert having only one active tooth) when used in in a threading operation where a final thread form is made through two or more passes, such as preferably through a radial infeed operation, a flank infeed operation, a modified flank infeed operation or an incremental infeed operation, and especially where the first top cutting edge is straight or linear in a top view.

Compared to a cutting edge which is sharp or comprises a sharp intersection or between the top surface and the side surface, a cutting edge having an edge roundness give the effect that a wear resistant coating layer can be applied having greater adherence, thereby reducing the wear.

The threading insert is a cutting insert which can be used in a turning operation. In other words, the threading insert is for use in a metal cutting operation, where a metal work piece rotates around a rotational axis thereof, and where the threading insert is moved, preferable linearly, relative to said metal work piece to form a thread form or thread profile in an external or internal surface of said metal work piece.

Other materials than metal can be used when cutting material using said threading insert.

The threading insert preferably comprises a wear resistant material, such as preferably cemented carbide.

The threading insert is arranged such that the threading insert can be mounted in an insert seat in a tool body, where said tool body is preferably made from steel.

The threading insert comprises a top surface, comprising a rake face, and an opposite bottom surface, where the bottom surface is a seating surface.

Preferably, an area of the bottom surface is smaller than an area of the top surface. The threading insert is preferably a positive cutting insert.

The threading insert may be formed without a hole. Preferably, the threading insert comprises a through hole, for a clamping screw, opening in the top and bottom surfaces.

The threading insert comprises a side surface connecting the top and bottom surfaces, where at least a portion of the side surface is a clearance surface.

The threading insert comprises a first tooth. In other words, the threading insert comprises at least one tooth, preferably 3-12 teeth. In a top view, the first tooth is a protruding portion of the threading insert.

The first tooth comprises a first cutting edge, formed along a border line between the top surface and the side surface.

The side surface is arranged such that sufficient clearance is achieved for the intended use (shape of thread form, threading method, diameter of thread, internal or external thread etc.). The clearance angles for the respective top, leading and trailing edges can be uniform, or may alternatively alter. However, all clearance angles are preferably within the range of 1-10°, even more preferably 2-8°.

The first cutting edge preferably has a shape thereof which corresponds to or relates to a shape of a thread form to be machined, or to a sub-portion of a shape of a thread form to be machined. In other words, the first cutting edge may be used to form a predetermined final or non-final thread form.

If the threading insert comprises one tooth, the first cutting edge is preferably arranged to form a predetermined final thread form.

If the threading insert comprises more than one tooth, the first cutting edge is preferably arranged to form a predetermined non-final final thread form.

The first cutting edge comprises a first top cutting edge, or a crown cutting edge, which first top cutting edge connects a first leading cutting edge and a first trailing cutting edge.

The first top cutting edge may be convex in a top view. Alternatively, the first top cutting edge may be straight or linear in a top view. In such case, the first top cutting edge preferably connects the first leading and trailing cutting edge, respectively, by convex corner cutting edges.

The first top cutting edge is arranged to form a root of a thread form.

The first leading and trailing cutting edges are arranged to form flanks of a thread form. In other words, the first leading and trailing cutting edges are flank cutting edges.

The first leading cutting edge is the portion of the first cutting edge which is intended to be ahead of the first top cutting edge in the intended feed direction.

The first trailing cutting edge is the portion of the first cutting edge which is intended to be behind the first top cutting edge in the intended feed direction.

The first cutting edge has an edge roundness, or edge honing. In other words, the intersection between the side surface and the top surface, at the first tooth, is not sharp. In other words, the first cutting edge is rounded, or convex, or curved, when seen in a cross section in a plane perpendicular to the first cutting edge. Said edge roundness may be in the form of a circular arch, or substantially similar to a circular arch, in said cross section. In such case, the size of the edge roundness is defined by the radius of curvature in said cross section. Said edge roundness may alternatively be in a form of an oval arch, or substantially similar to an oval arch, in said cross section. In such case, the edge roundness has a width and a height, and where the size of the edge roundness is defined by said height.

The edge roundness connects the side surface and the top surface. The top surface is preferably flat, i.e. planar. The top surface and the bottom surface are preferably arranged in parallel planes.

The size of the edge roundness varies along the first cutting edge. In other words, the size of the edge roundness is not constant when measured at different portions of the first cutting edge.

The size of the edge roundness may vary between a range of 5 and 100 µm, preferably within a range of 10 and 90 µm.

The size of the edge roundness may vary along the first cutting edge in different ways.

For example, the edge roundness of the first leading cutting edge may be greater than the edge roundness of the first trailing cutting edge.

A further example is that the edge roundness of each of the first leading cutting edge and the first trailing cutting edge are greater than the edge roundness of the first top cutting edge.

Said edge variable edge roundness may preferably be achieved through an abrasive process, preferably through a blasting process. Alternatively, said variable edge roundness may be achieved through a material removal process such as e.g. electrical discharge machining (EDM), brushing or laser.

According to an embodiment, the edge roundness is in the form of a circular or oval arch, and in that the size of the edge roundness along the first cutting edge varies between a range of 5 and 100 µm.

The inventors have found that by such a threading insert, a thread profile can be made more efficiently, in terms of reduced insert wear and/or enhanced surface finish and/or less vibration tendencies.

According to an embodiment, an edge roundness of the first top edge is greater than an edge roundness of the first trailing cutting edge.

By such a threading insert, the tool life of the threading insert is further improved and/or the quality of the machined thread form is further improved.

The edge roundness of the first top edge is greater than an edge roundness of the first trailing cutting edge, where said edge radii are measured in a cross section perpendicular each respective cutting edge. Said edge radii are measured at mid-points of each respective cutting edge.

Preferably, the edge roundness of the first top edge is greater than an edge roundness of the first leading cutting edge.

According to an embodiment, the edge roundness of the first trailing cutting edge is 10-40 µm, in that the edge roundness of the first top cutting edge is 25-80 µm, and in that the edge roundness of the first top cutting edge is at least 5 µm greater than the edge roundness first trailing cutting edge.

By such a threading insert, the tool life of the threading insert is further improved and/or the quality of the machined thread form is further improved.

Preferably, the edge roundness of the first leading cutting edge is 10-40 µm.

Preferably, the edge roundness of the first top edge is at least 5 µm greater than an edge roundness of the first leading cutting edge.

According to an embodiment, an edge roundness of the first leading cutting edge is greater than the edge roundness of the first trailing cutting edge.

By such a threading insert, the tool life of the threading insert is further improved and/or the quality of the machined thread form is further improved, especially if the threading insert is used in a modified flank infeed operation.

The first top cutting edge may in a top view be straight or linear. Alternatively, the first top cutting edge may in a top view be in the form of a circular arch, preferably having a radius thereof within the range of 0.04-1.2 mm, more preferably 0.2-1.0 mm.

In a top view, the first leading cutting edge and the first trailing cutting edge preferably form an angle of 50-70°.

According to an embodiment, in a top view the first leading cutting edge and the first trailing cutting edge converge toward the first top cutting edge, and in that in a top view, the first leading cutting edge and/or the first trailing cutting edge is straight or substantially straight.

In a top view, the first leading cutting edge and the first trailing cutting edge preferably form an angle relative to each other which is within the range of 5-70°.

According to an embodiment, in a top view, the threading insert extends beyond a sector limited by a first line coinciding with the first leading cutting edge and a second line coinciding with the first trailing cutting edge.

By such a threading insert, the crest of a thread profile can be machined.

The threading insert preferably extends beyond or outside said sector on both sides of the first and second lines.

According to an embodiment, in a top view the first top cutting edge is straight or substantially straight.

According to an embodiment, the threading insert comprises a second tooth, in that the second tooth comprises a second cutting edge, the second cutting edge comprises a second top cutting edge connecting a second leading cutting edge and a second trailing cutting edge, the second cutting edge has an edge roundness, in that the second tooth is arranged to cooperate with the first tooth for cutting a thread profile, in that the size of the first tooth is smaller than the size of the second tooth, in that the first trailing cutting edge is facing the second leading cutting edge.

By such a threading insert, the material which is removed from a metal work piece when forming the thread form can be made by both the first tooth and the second tooth, giving a longer tool life for the threading insert.

The threading insert comprises a second tooth, spaced apart from the first tooth. In analogue or similar way as for the first tooth, the second tooth comprises a second cutting edge, which second cutting edge comprises a second top cutting edge connecting a second leading cutting edge and a second trailing cutting edge.

In an analogue or similar way as for the first cutting edge, the second cutting edge has an edge roundness.

The second tooth is arranged, or positioned, to cooperate with the first tooth for cutting a thread profile. In other words, the first and second tooth are arranged such that the first cutting edge and the second cutting edge can be simultaneously active when cutting a thread profile.

When seen in a top view, the size of the first tooth is smaller than the size of the second tooth. Preferably, the first tooth is smaller by being smaller in height relative to the second tooth. In other words, and preferably, the diameter of the thread profile, defined by the root of the thread profile, formed by the first tooth is greater than the diameter of the thread profile formed by the second tooth.

The first tooth is arranged such that it can be arranged ahead of the second tooth in the feed direction.

There may be intermediate teeth formed between the first tooth and the second tooth. Alternatively, there may be no tooth between the first tooth and the second tooth.

The first trailing cutting edge is facing the second leading cutting edge. In other words, the first trailing cutting edge is between the second leading cutting edge and the first leading cutting edge.

According to an embodiment, the edge roundness of the first top cutting edge is greater than an edge roundness of the second top cutting edge.

By such a threading insert, commonly known as a multi-teeth threading insert, an improvement is made regarding the insert wear of the first tooth, in particular regarding the wear of the first top edge, and/or regarding the surface quality of the machined thread profile.

The inventors have found that for a multi-teeth threading insert, where a first smaller tooth, for removing material in a thread profile, is followed by a second larger tooth, for generating the final shape of said thread profile, a relatively greater edge roundness of the first top cutting edge may reduce the wear of the first tooth and a relatively smaller edge roundness for the second top cutting edge may improve the surface quality of the thread profile.

The edge roundness of the first top cutting edge is greater, preferably 10-50 µm greater, than an edge roundness of the second top cutting edge.

According to an embodiment, the edge roundness of the first leading cutting edge is greater than an edge roundness of the second leading cutting edge.

By such a threading insert, the tool life for the threading insert can be increased and/or the quality of the machined thread profile may be increased.

The edge roundness of the first leading cutting edge (8) is preferably 10-60 µm greater than an edge roundness of the second leading cutting edge.

According to an embodiment, the turning insert comprises 1-5 intermediate teeth arranged between the first tooth and the second tooth, said intermediate teeth being arranged to cooperate with the first and second teeth for cutting a thread profile, in that one intermediate tooth, adjacent to the first tooth, comprises an intermediate top cutting edge, in that an edge roundness of said intermediate top cutting edge is greater than the edge roundness of the second top cutting edge.

The turning insert comprises 1-5, preferably 2-4, intermediate teeth. Said intermediate teeth are arranged between the first tooth and the second tooth. Said intermediate teeth arranged to cooperate with the first and second teeth for cutting a thread profile. In other words, the first, second and intermediate teeth are arranged such that each of said teeth are active (remove material) when forming a thread profile.

The second tooth is arranged to cut a final shape of a thread profile.

The threading insert comprises a plurality, or at least three, teeth. Said teeth are preferably arranged in a row, such that a straight line can be drawn which straight line intersects all teeth in said row.

The first tooth and the second tooth are each end teeth in said row of teeth.

The size of the teeth in said row preferably increases from the first tooth to the second tooth.

An intermediate tooth, adjacent to the first tooth, comprises an intermediate cutting edge which intermediate cutting edge comprises an intermediate top cutting edge.

An edge roundness of said intermediate top cutting edge is greater, preferably 10-50 µm greater, than the edge roundness of the second top cutting edge.

According to an embodiment, a method to manufacture a threading insert according to any of the above described embodiments comprises the steps of: providing a threading insert blank comprising a first tooth, the first tooth comprising a first cutting edge, the first cutting edge comprising a first top cutting edge connecting a first leading cutting edge and a first trailing cutting edge; blasting the first cutting edge such that a beam comprising an abrasive medium is directed towards the first cutting edge; and altering at least one blasting parameter as the beam moves along the first cutting edge.

By such a method a variable edge roundness of a threading insert can be achieved, even if the geometry of the threading insert is complex. The inventors have found that for an abrasive method which include a rotating body, edge roundness of complex geometry threading inserts, e.g. multi-teeth threading inserts, cannot be easily achieved because of e.g. geometrical limitations of the rotating body. Especially, edge roundness of trailing and/or leading cutting edges of an intermediate tooth is difficult or impossible to produce by such method.

By such a method, an edge roundness of different teeth or on different portions of a cutting edge can by varied over a large range or may be selected in a more freely.

The method to manufacture the threading insert comprising the step of providing a threading insert blank comprising a first tooth. The threading insert blank comprises a top surface, an opposite bottom surface, and a side surface connecting the top and bottom surfaces. The threading insert blank is preferably made from sintered cemented carbide. The threading insert blank is preferably uncoated. The threading insert blank preferably comprises a through hole opening in the top and bottom surfaces.

The first tooth comprising a first cutting edge. More precisely, an intersection at the first tooth between the top surface and the side surface form an edge, which is sharp or is rounded, preferably at least 10 µm. Alternatively said intersection may be formed in other ways.

The first cutting edge comprises a first top cutting edge connecting a first leading cutting edge and a first trailing cutting edge.

The method comprises a blasting step by which the edge roundness of the first cutting edge is increased.

Through the blasting step, material is removed from the threading insert blank. In particular, material from the first cutting edge of the threading insert blank is removed.

The blasting step may be either a wet-blasting step or a dry-blasting step. Preferably, the blasting step is a wet-blasting step.

The method comprises the step of blasting the first cutting edge such that a beam, or stream or jet, comprising an abrasive medium is directed towards the first cutting edge. Said beam may preferably comprise water, and may further comprise viscosity-increasing substances such as glycerin and/or starch.

Said abrasive medium may e.g. comprise abrasive particles made from a hard material. Said abrasive particles may e.g. comprise aluminum oxide.

Said beam is preferably directed towards the first cutting edge by means of a blasting gun. Said blasting gun preferably comprises a nozzle from which said beam exits said blasting gun.

Said blasting gun is preferably controllable by one or more control device such as one or more computer device and/or one or more mechanical device.

In said blasting process, using said blasting gun, blasting parameters, or blasting process parameters are thus controllable. Blasting parameters include: blasting pressure, distance from said nozzle to said blank, velocity of said beam, blasting time for each portion of the first cutting edge, impact angle, and velocity and direction of movement of said blasting gun relative to said insert blank.

The edge roundness of the portion of the first cutting edge which is subject to said beam can be made smaller or greater by altering, or changing or varying, of one or more blasting parameters. For example, a lower relative velocity gives an increase in edge roundness.

Said method includes the step of moving said beam relative to the first cutting edge such that the first leading cutting edge, the first top cutting edge and the first trailing cutting edge are in a sequence impacted by said beam.

The expression "altering at least one blasting parameter as the beam moves along the first cutting edge" may be interpreted as "simultaneously moving the beam along the first cutting edge and altering at least one blasting parameter". By the above mention step, the edge roundness of the first cutting edge will have a variable (i.e. non-constant) value or size.

Said method may preferably be used for a threading insert blank which comprises more than one tooth.

Said method may preferably comprise the further step of providing a coating layer on an outer surface of the threading insert. Said coating layer is preferably applied to at least the first cutting edge. Said coating layer may preferably be provided through a PVD process or a CVD process.

According to an embodiment, a method to manufacture a threading insert according to any of the above described embodiments comprises the steps of: providing a threading insert blank comprising a first tooth, the first tooth comprising a first cutting edge, the first cutting edge comprising a first top cutting edge connecting a first leading cutting edge and a first trailing cutting edge; removing material from the first cutting edge such that a laser beam is directed towards the first cutting edge; and altering at least one laser beam parameter as the laser beam moves along the first cutting edge.

Said laser beam parameters may be e.g. laser intensity, laser wavelength, laser pulse length, laser flux or velocity. The at least one laser beam parameter alters or varies as the laser beam moves along the first cutting edge such that the material removal rate varies. The laser wavelength of is preferably approximately 1.064 nm.

According to an embodiment, a method to manufacture a thread profile comprises the steps of providing a threading insert according to any of the above described embodiments, providing a metal work piece, rotating the metal work piece around a rotational axis (A1) thereof, and moving the threading insert in a feed direction such that the first leading cutting edge is facing the feed direction.

By such a method, the manufacturing of a thread profile can be made in a more economical manner and/or with a higher thread profile quality.

The method to manufacture a predetermined thread profile comprises the step of providing a threading insert in accordance with any of the above described embodiments.

The thread profile may be an external thread profile or an internal thread profile.

The method preferably comprises the step of providing a computerized numerical control (CNC) lathe.

The method preferably comprises the step of providing a tool body, and the step of clamping the tool body to the computerized numerical control lathe.

The method preferably comprises the step of clamping the threading insert to said tool body.

The method comprises a providing a metal work piece, in which the thread profile is to be manufactured or formed. If the thread profile to be formed is an internal thread profile, the metal work piece is a tube or a hollow bar, or comprises a bore. The metal work piece is preferably made from steel.

The method comprises the step of rotating the metal work piece around a rotational axis thereof.

The method comprises the step of moving, or feeding, the threading insert in a feed direction such that the first leading cutting edge is facing the feed direction.

In other words, the first leading cutting edge is ahead of the first trailing cutting edge in the feed direction.

The feed rate is preferably constant. The feed rate is equal to the pitch of the thread profile.

According to an embodiment, the method to manufacture a predetermined thread profile further comprises the steps of selecting the threading insert according to any of the described embodiments where the threading insert comprises a second tooth, and manufacture the thread profile such that the final shape of the thread profile is achieved by the second cutting edge.

By such a method, the tool life of the threading insert can be further improved and/or the quality of the thread profile can be improved. The first cutting edge, which machine a non-final thread profile, is in the feed direction followed by the second cutting edge which machine a final thread profile.

According to an embodiment, the method to manufacture a predetermined thread profile further comprising the steps of providing a threading insert according to any of the above described embodiments, and machining the thread form through multiple passes through a modified flank infeed operation.

Preferably, the threading insert is arranged such that the edge roundness of the first leading cutting edge is greater than the edge roundness of the first trailing cutting edge.

Preferably, the threading insert is arranged such that the threading insert comprises only one active tooth (the first tooth).

Preferably, the threading insert is arranged such that the first top cutting edge is in the form of a circular arc in a top view.

A modified flank infeed operation is a threading operation in multiple passes, where in each pass, the cutting load for the leading cutting edge is greater than the cutting load for the trailing cutting edge. This is achieved by selecting an infeed angle which is not zero. Preferably, the modified flank infeed operation comprises the step of selecting an infeed angle to 0.5-10°, even more preferably 0.8-6°.

According to an embodiment, the method to manufacture a predetermined thread profile further comprising the steps of providing a computerized numerical control lathe, in that the movement of the threading insert and the rotation of the metal work piece is controlled by the computerized numerical control lathe.

According to an embodiment, a computer program having instructions which when executed by a computer numerical control lathe cause the computer numerical control lathe to perform the above described method to manufacture a predetermined thread profile.

The computer program may be stored on a computer readable medium. Alternatively, a data stream may be representative of the computer program.

DESCRIPTION OF THE DRAWINGS

The present invention will now be explained in more detail by a description of different embodiments of the invention and by reference to the accompanying drawings.

All threading insert figures have been drawn to scale.

DETAILED DESCRIPTION OF EMBODIMENTS OF THE INVENTION

Figure 1:
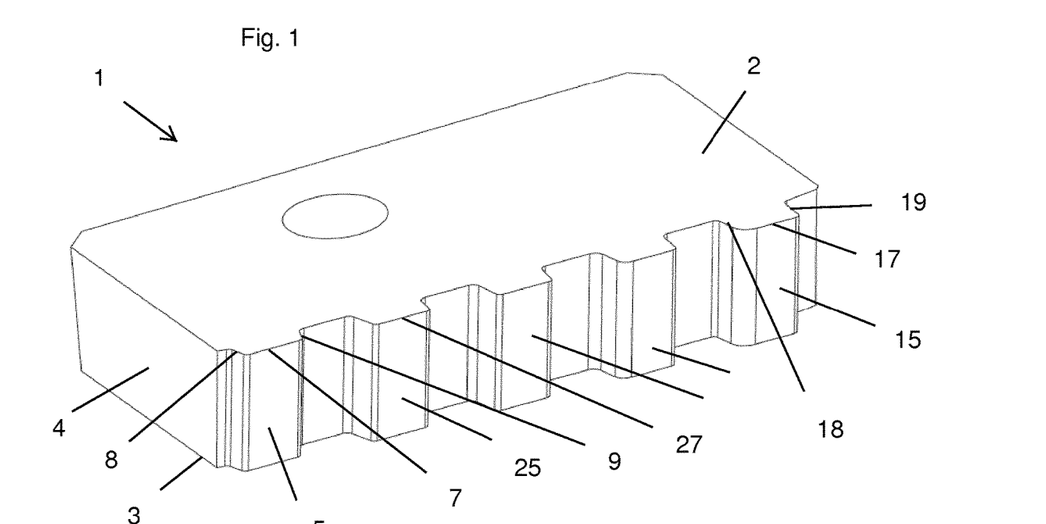
FIG. 1 is a perspective view showing a threading insert according to a first embodiment.
Figure 2:
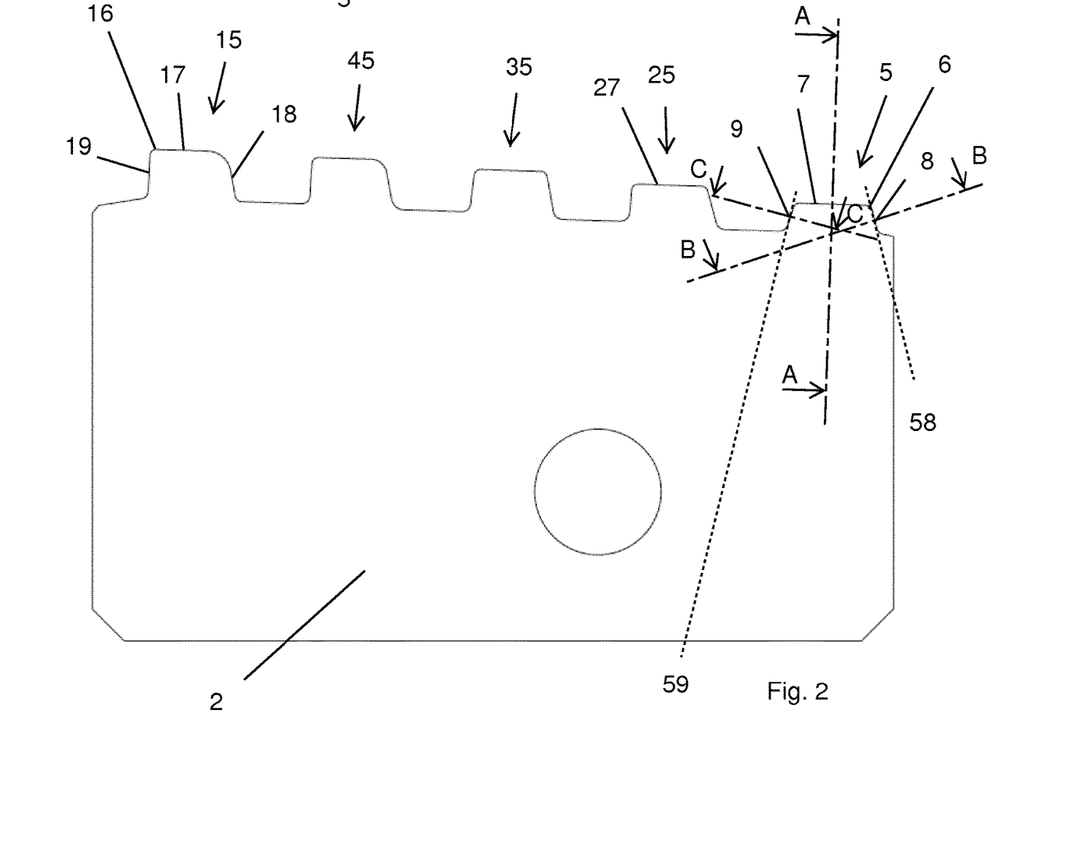
FIG. 2 is a top view of the threading insert in FIG. 1.

Attention is now drawn to FIGS. 1-2 which show a threading insert 1 according to a first embodiment. The threading insert 1 comprising a top surface 2, an opposite bottom surface 3 and a side surface 4 connecting the top surface 2 and the bottom surface 3. The threading insert 1 comprises a first tooth 5, and said first tooth 5 comprises a first cutting edge 6. The first cutting edge 6 comprising a first top cutting edge 7 connecting a first leading cutting edge 8 and a first trailing cutting edge 9. In a top view, as seen in FIG. 2, the first leading cutting edge 8 and the first trailing cutting edge 9 converge toward the first top cutting edge 7, and the first leading cutting edge 8, the first trailing cutting edge 9 and the first top cutting edge 7 are each straight or substantially straight.

In a top view, seen in FIG. 2, the threading insert 1 extends beyond a sector limited by a first line 58 coinciding with the first leading cutting edge 8 and a second line 59 coinciding with the first trailing cutting edge 9.

The threading insert 1 comprises a second tooth 15, comprising a second cutting edge 16. The second cutting edge 16 comprises a second top (crown) cutting edge 17 connecting a second leading cutting edge 18 and a second trailing cutting edge 19. The second tooth 15 is arranged to cooperate with the first tooth 5 for cutting a thread profile 10. The size of the first tooth 5 is smaller than the size of the second tooth 15 when seen in top view as shown in FIG. 2. The first trailing cutting edge 9 is facing the second leading cutting edge 18.

The turning insert 1 comprises 3 intermediate teeth 25, 35, 45, arranged between the first tooth 5 and the second tooth 15. Said intermediate teeth 25, 35, 45 are arranged to cooperate with the first and second teeth 5, 15 for cutting a thread profile 10.

In other words, the first, second and intermediate teeth 5, 15, 25, 35, 45 are arranged to be simultaneously active in a threading operation. Said teeth are arranged in a row.

Figures 3, 4:
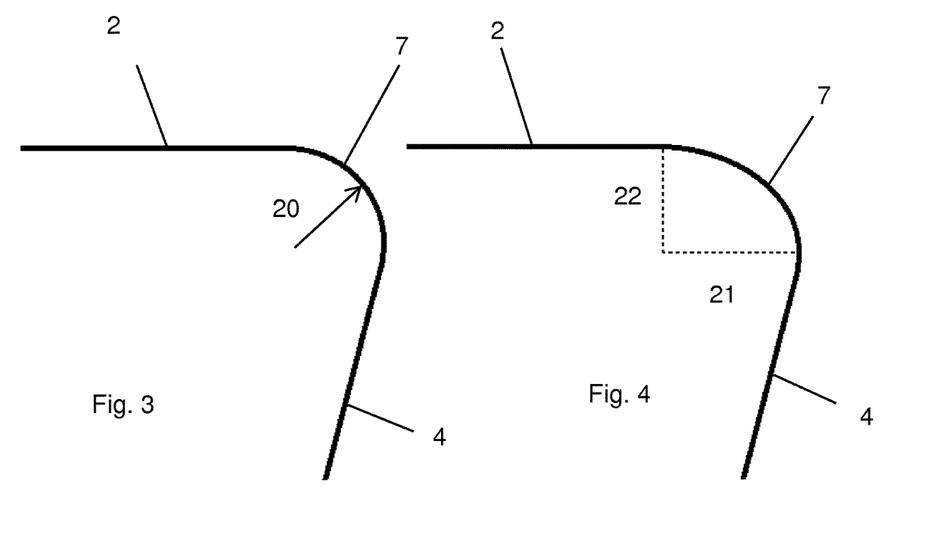
FIG. 3 is a cross-sectional view from the A-A line shown in FIG. 2.
FIG. 4 is an alternative to the view shown in FIG. 3.

The first cutting edge 6 has an edge roundness. The size of the edge roundness varies along the first cutting edge 6. FIG. 3 show a cross-sectional view from the A-A line shown in FIG. 2, where the edge roundness 20 of the first top cutting edge 7 is in the form of a circular arch, where the size of the edge roundness is defined by the radius, or radius of curvature, of said circular arch. Alternatively, as seen in FIG. 4, said edge roundness may alternatively be in a form of an oval arch seen in said cross section from said A-A line. In such case, the edge roundness has a width 21 and a height 22, and where the size of the edge roundness is defined by said height 22.

Seen in FIG. 2, said A-A line is drawn perpendicular to a mid-point of the first top cutting edge 7 in a top view. In a corresponding manner, cross-sectional views from the B-B and C-C lines in FIG. 2 can be made to illustrate how the edge roundness of the respective first leading and trailing cutting edges 8, 9 should be determined.

In a corresponding manner, the second cutting edge 16 has an edge roundness.

The edge roundness of the first trailing cutting edge 9 is within a range of 10-40 µm. The edge roundness 20 of the first top cutting edge 7 is within a range of 25-80 µm. The edge roundness 20 of the first top cutting edge 7 is at least 5 µm greater than the edge roundness first trailing cutting edge 9. The edge roundness 20 of the first top cutting edge 7 is greater than an edge roundness of the second top cutting edge 17. The edge roundness of the first leading cutting edge 8 is greater than an edge roundness of the second leading cutting edge 18.

The intermediate tooth 25 adjacent to the first tooth 5 comprises an intermediate top cutting edge 27. An edge roundness of said intermediate top cutting edge 27 is greater than the edge roundness of the second top cutting edge 17.

The teeth of the threading insert 1 according to the first embodiment comprises 5 teeth, which teeth from left to right in FIG. 2 are designated 15, 45, 35, 25, 5. The edge roundness size of the respective top cutting edge of said teeth are as follows from left to right: 25-45 µm, 25-45 µm, 50-70 µm, 50-70 µm, 50-70 µm.

Figure 6:
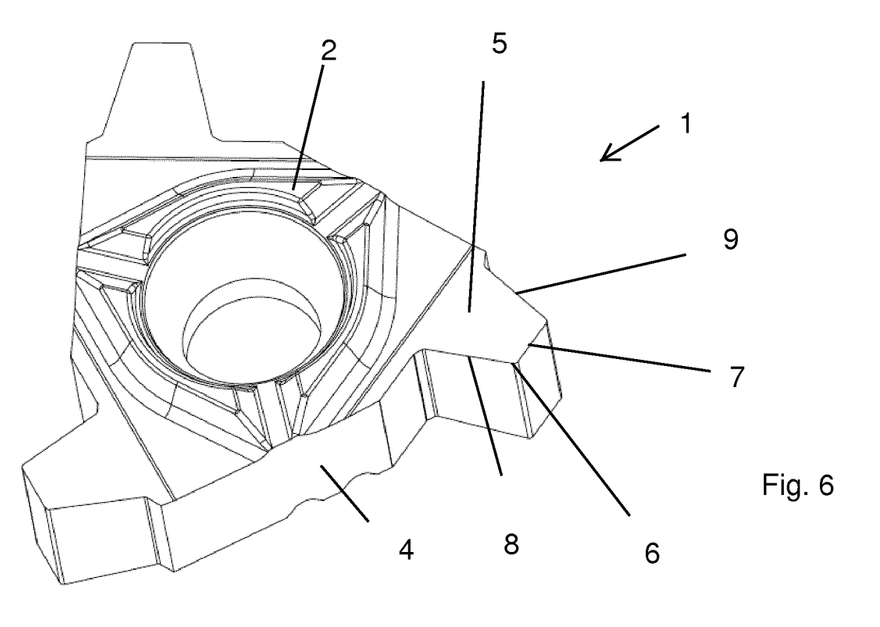
FIG. 6 is a perspective view showing a threading insert according to a second embodiment.
Figure 7:
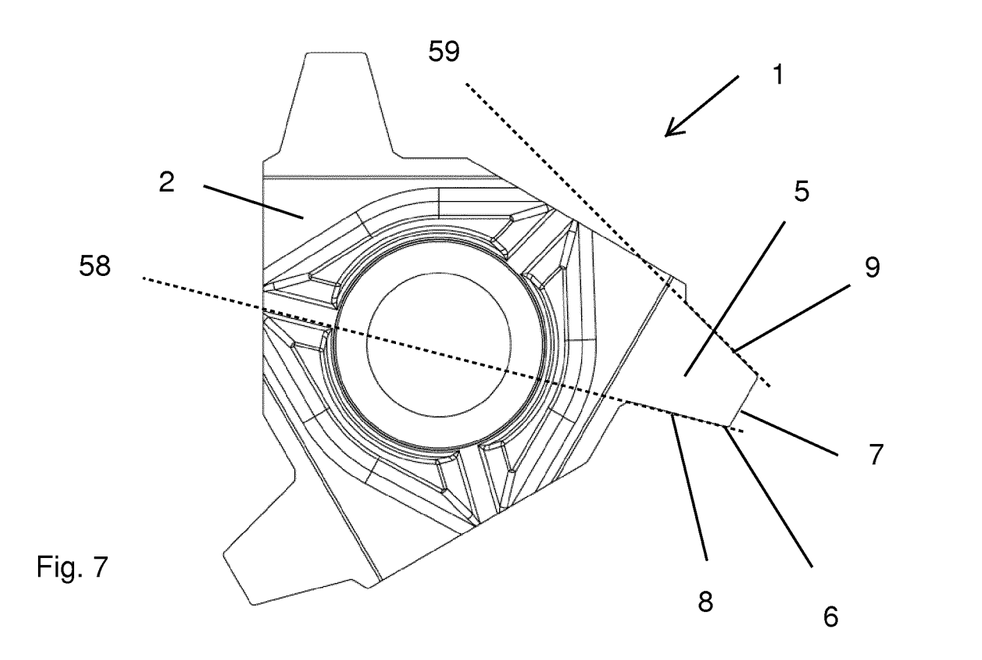
FIG. 7 is a top view of the threading insert in FIG. 6.

Attention is now drawn to FIG. 6-7, which show a threading insert 1 according to a second embodiment. The threading insert 1 comprises a top surface 2, an opposite bottom surface 3 and a side surface 4 connecting the top surface 2 and the bottom surface 3. The threading insert comprises a first tooth 5. The first tooth 5 comprising a first cutting edge 6. The first cutting edge 6 comprising a first top cutting edge 7 connecting a first leading cutting edge 8 and a first trailing cutting edge 9. In a corresponding manner as for the threading insert according to the first embodiment, the first cutting edge 6 has an edge roundness, and the size of the edge roundness varies along the first cutting edge 6. An edge roundness 20 of the first top edge 7 is greater than an edge roundness of the first trailing cutting edge 9.

In a top view, as seen in FIG. 7, the first top, leading and trailing cutting edges 7, 8, 9 are each straight or substantially straight, and the first leading cutting edge 8 and the first trailing cutting edge 9 converge toward the first top cutting edge 7.

in that in a top view, the threading insert 1 extends beyond a sector limited by a first line 58 coinciding with the first leading cutting edge 8 and a second line 59 coinciding with the first trailing cutting edge 9. The threading insert 1 according to the second embodiment is in top view 120° symmetrical, and thus comprises 3 teeth. During use, only one tooth is active.

Figure 8:
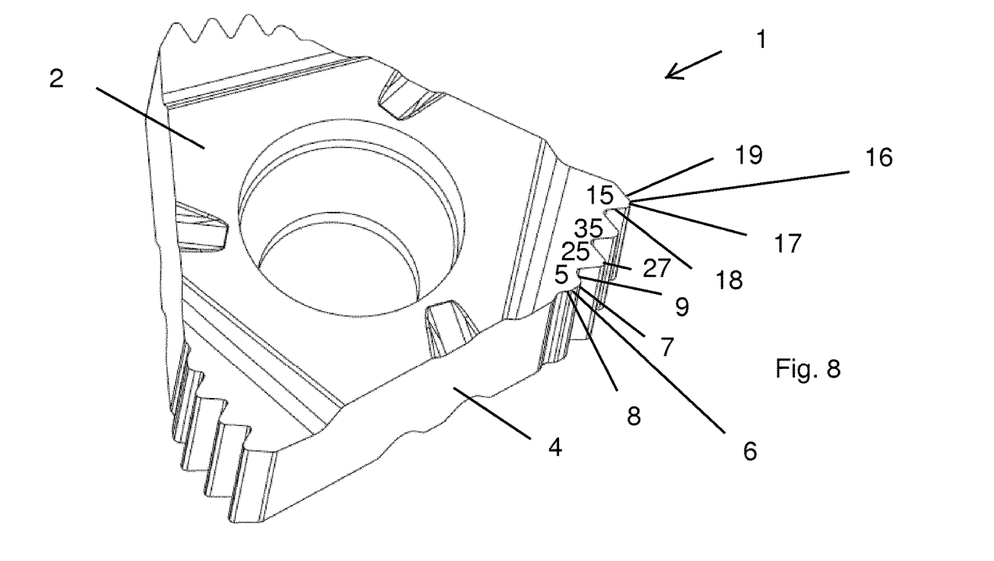
FIG. 8 is a perspective view showing a threading insert according to a third embodiment.
Figure 9:
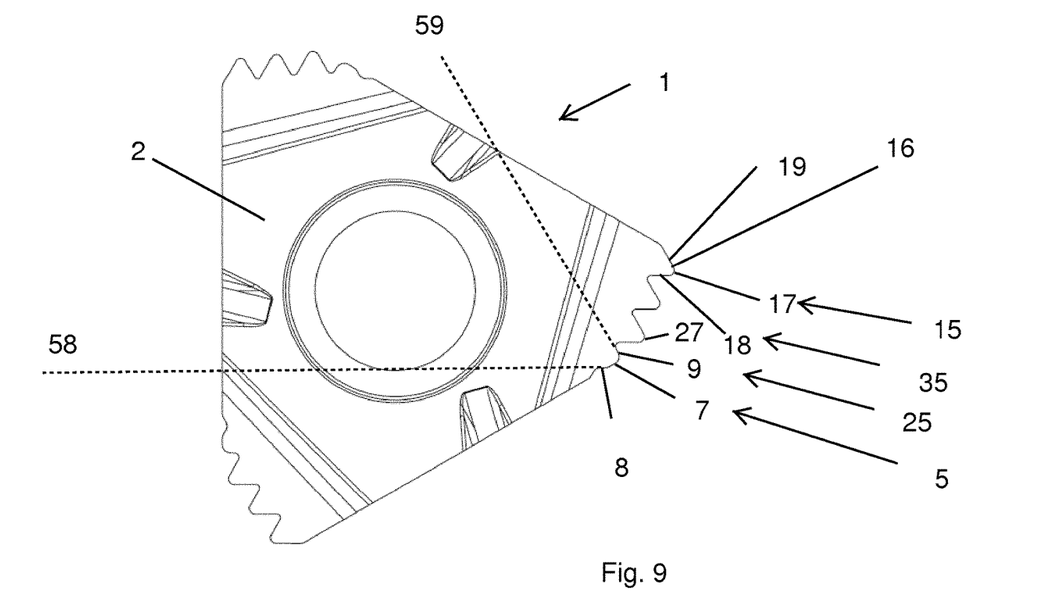
FIG. 9 is a top view of the threading insert in FIG. 8.

Attention is now drawn to FIGS. 8-9 which show a threading insert 1 according to a third embodiment. The threading insert 1 comprises a top surface 2, an opposite bottom surface 3 and a side surface 4 connecting the top surface 2 and the bottom surface 3. The threading insert comprises a first tooth 5. The first tooth 5 comprising a first cutting edge 6. The first cutting edge 6 comprising a first top cutting edge 7 connecting a first leading cutting edge 8 and a first trailing cutting edge 9. In a corresponding manner as for the threading insert according to the first embodiment, the first cutting edge 6 has an edge roundness, and the size of the edge roundness varies along the first cutting edge 6. An edge roundness 20 of the first top edge 7 is greater than an edge roundness of the first trailing cutting edge 9. In a top view, seen in FIG. 9, the first leading cutting edge 8 and the first trailing cutting edge 9 converge toward the first top cutting edge 7, and the first leading and trailing cutting edges 8, 9 are each straight or substantially straight. In a top view, as seen in FIG. 9, the threading insert 1 extends beyond a sector limited by a first line 58 coinciding with the first leading cutting edge 8 and a second line 59 coinciding with the first trailing cutting edge 9. The threading insert 1 comprises a second tooth 15. The second tooth 15 comprising a second cutting edge 16. The second cutting edge comprising a second top cutting edge 17 connecting a second leading cutting edge 18 and a second trailing cutting edge 19. The second cutting edge 16 has an edge roundness. The second tooth 15 is arranged to cooperate with the first tooth 5 for cutting a thread profile 10. The size of the first tooth 5 is smaller than the size of the second tooth 15. The first trailing cutting edge 9 is facing the second leading cutting edge 18. The edge roundness 20 of the first top cutting edge 7 is greater than an edge roundness of the second top cutting edge 17.

The turning insert 1 comprises 2 intermediate teeth 25, 35 arranged between the first tooth 5 and the second tooth 15. Said intermediate teeth 25, 35 are arranged to cooperate with the first and second teeth 5, 15 for cutting a thread profile 10.

The threading insert 1 according to the third embodiment is in top view 120° symmetrical, and thus comprises 3 sets of teeth. During use, only one set of teeth 5, 15, 25, 35 is active.

Figure 11:
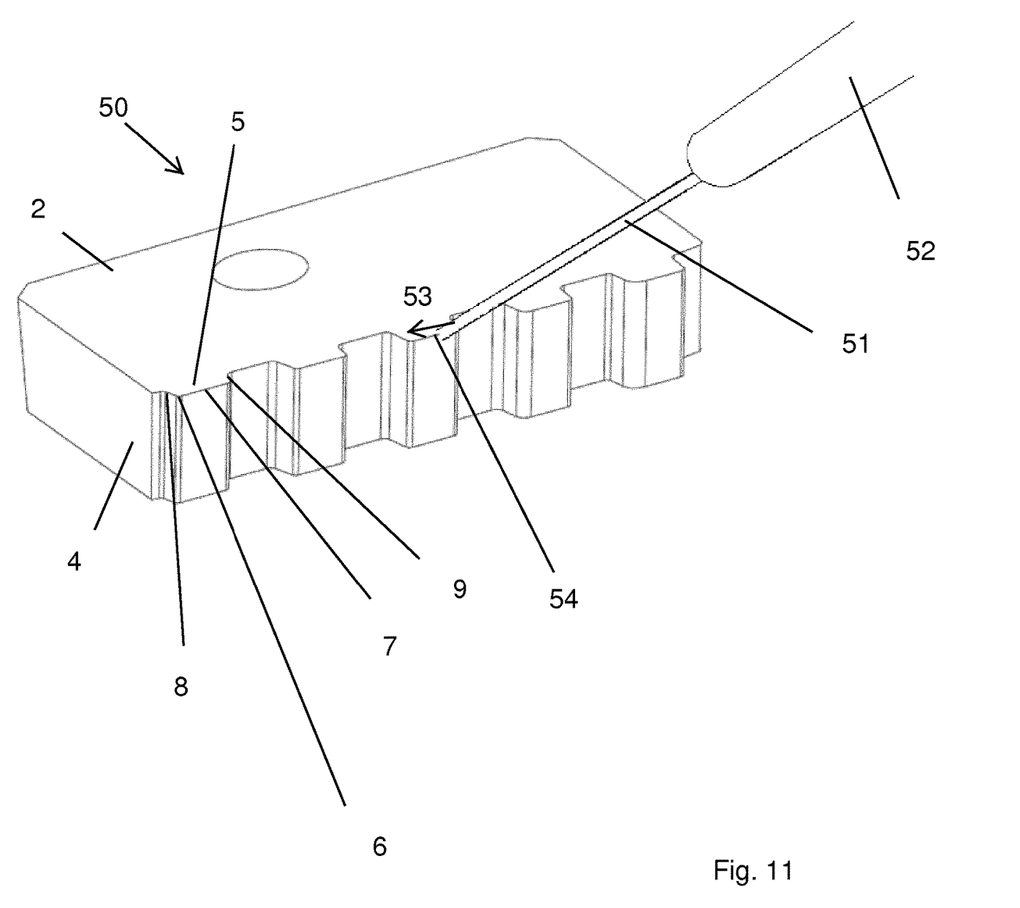
FIG. 11 is a perspective view showing a method step for manufacturing the threading insert in FIG. 1.

Attention is now drawn to FIG. 11 which relates to a method to manufacture a threading insert, providing a threading insert blank 50 comprising a first tooth 5. The first tooth 5 comprises a first cutting edge 6, the first cutting edge 6 comprising a first top cutting edge 7 connecting a first leading cutting edge 8 and a first trailing cutting edge 8.

In FIG. 11, it is shown a method to manufacture a threading insert according to the first embodiment. The method includes the step of blasting the first cutting edge 6 such that a beam 51 comprising an abrasive medium is directed towards the first cutting edge 6 and altering at least one blasting parameter as the beam 51 moves along the first cutting edge 6.

In FIG. 11, said beam 51 is directed to an intermediate tooth. In other words, the point, or area, of impact 54 is at an intermediate tooth. Said beam 51 is ejected from an outlet or a nozzle of a blasting gun 52. The point of impact 54 is moving along the teeth in a direction 53, which direction 53 is non-linear. In such a way, all teeth, including the first tooth 5, are subject to said beam 51 in the blasting process.

Figure 5:
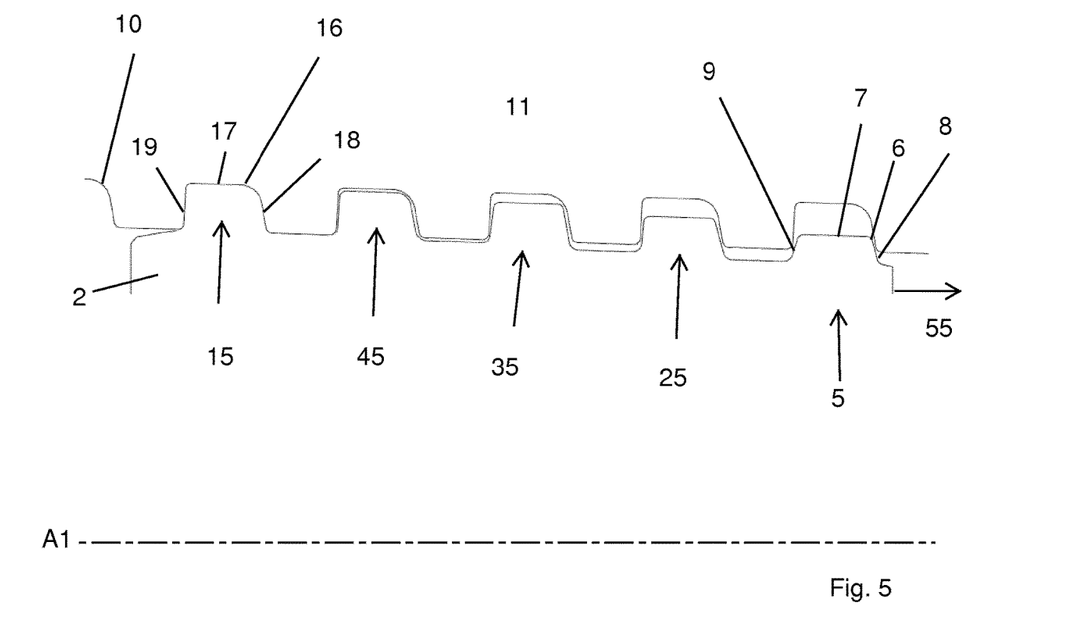
FIG. 5 is a top view showing a threading method which includes the threading insert in FIG. 1.

Attention is now drawn to FIG. 5 which relates to a method to manufacture a thread profile 10. A threading insert 1 according to the first embodiment is provided for machining a metal work piece 11.

The metal work piece 11 is rotating around a rotational axis A1 thereof. The method includes the step of moving the threading insert 1 in a feed direction 55 such that the first leading cutting edge 8 is facing the feed direction 55. The threading insert 1 comprises five teeth 5, 15, 25, 35, 45. The final shape of the thread profile 10 is achieved by the second cutting edge 15.

In FIG. 5, the thread profile 10 is shown as the final thread profile 10, and is tapered by an angle of approximately 1.78°.

During the method shown in FIG. 5, the said five teeth are active, as well as the portions, in the intersection between the top surface 2 and the side surface 4, between adjacent teeth.

The method comprises the step of providing a computerized numerical control lathe (not shown). FIG. 5 show internal threading. Alternatively, the method can be used for external threading.

Figure 10:
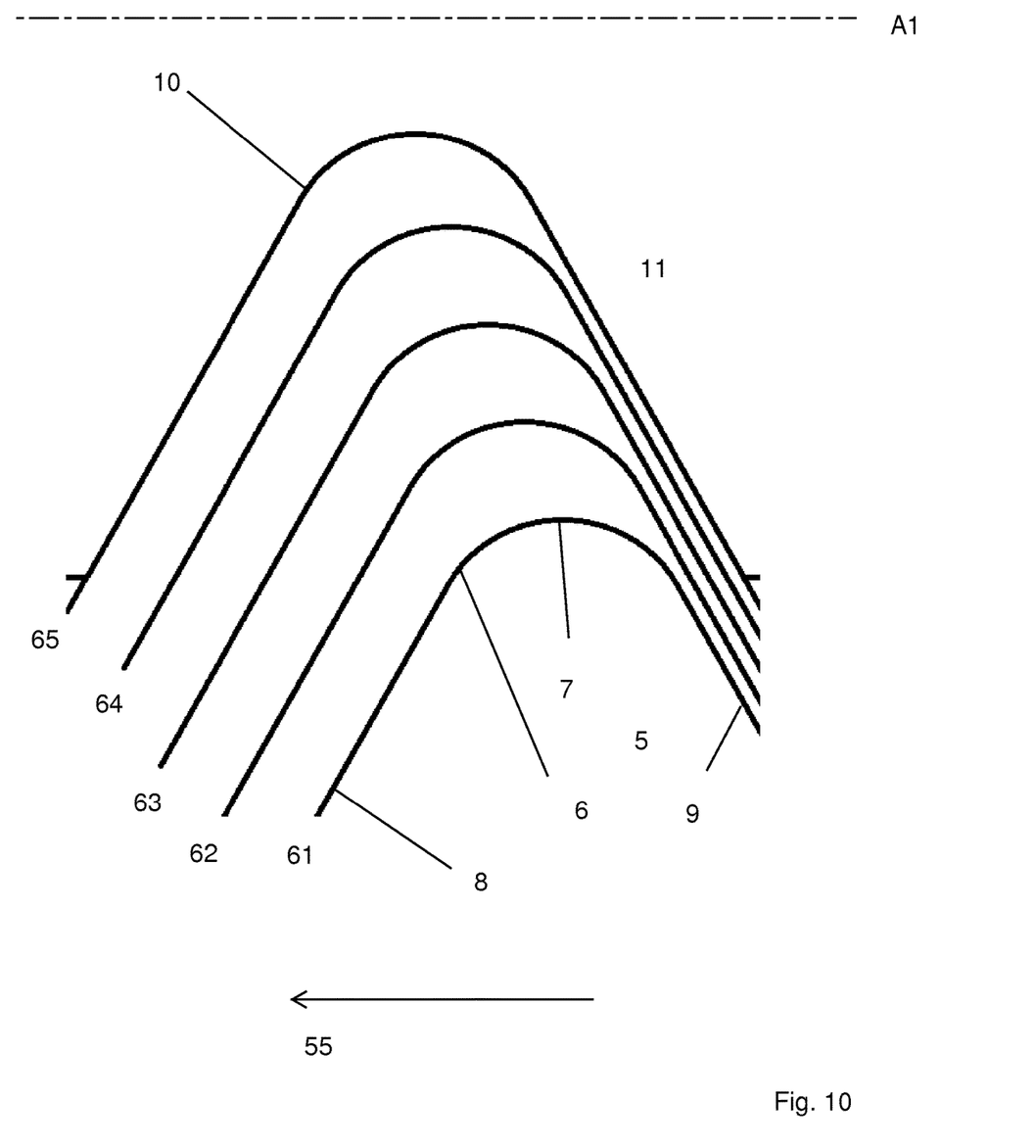
FIG. 10 is a top view showing a threading method which includes a threading insert according to a fourth embodiment.

Attention is now drawn to FIG. 10 which relates to a method to manufacture a thread profile 10 by means of a threading insert 1 according to a fourth embodiment. A metal work piece 11 is rotating around a rotational axis A1 thereof. The threading insert 1 is moving in a feed direction 55 such that the first leading cutting edge 7 is facing the feed direction 55. The thread form is machined through multiple passes 61, 62, 63, 64, 65 through a modified flank infeed operation.

The threading insert according to the fourth embodiment comprises a first tooth 5 comprising a first cutting edge 6. The first cutting edge 6 comprises a first top cutting edge 7 connecting a first leading cutting edge 8 and a first trailing cutting edge 9. The first cutting edge 6 has an edge roundness. The size of the edge roundness varies along the first cutting edge 6 such that an edge roundness of the first leading cutting edge 8 is greater than an edge roundness of the first trailing cutting edge 9. In a top view, as seen in FIG. 10, the first leading cutting edge 8 and the first trailing cutting edge 9 converge toward the first top cutting edge 7. In a top view, the first leading cutting edge 8 and the first trailing cutting edge 9 are each straight or substantially straight. In a top view, the first top cutting edge is in the form of a circular arch, having a radius of 0.1-1.2 mm, more preferably 0.2-1.0 mm. In a top view, the first leading cutting edge and the first trailing cutting edge form an angle of 50 70°.

The invention claimed is:

1. A threading insert comprising:
    a top surface, an opposite bottom surface, and a side surface connecting the top surface and the bottom surface;
    a first tooth, the first tooth including a first cutting edge, the first cutting edge having a first top cutting edge connecting a first leading cutting edge and a first trailing cutting edge, wherein the first cutting edge has an edge roundness, when seen in a cross-section in a plane perpendicular to the first cutting edge, and wherein a size of the edge roundness varies along the first cutting edge, wherein an edge roundness of the first top cutting edge is greater than an edge roundness of the first trailing cutting edge; and
    a second tooth, the second tooth including a second cutting edge, the second cutting edge having a second top cutting edge connecting a second leading cutting edge and a second trailing cutting edge, wherein the second cutting edge has an edge roundness, the second tooth being arranged to cooperate with the first tooth for cutting a thread profile, a size of the first tooth being smaller than a size of the second tooth, wherein the first trailing cutting edge faces the second leading cutting edge.

2. The threading insert according to claim 1, wherein the edge roundness is in a form of a circular or oval arch, and wherein the size of the edge roundness along the first cutting edge varies between a range of 5 and 100 μm.

3. The threading insert according to claim 1, wherein the edge roundness of the first trailing cutting edge is 10-40 μm, the edge roundness of the first top cutting edge is 25-80 μm, and the edge roundness of the first top cutting edge is at least 5 μm greater than the edge roundness first trailing cutting edge.

4. The threading insert according to claim 1, wherein an edge roundness of the first leading cutting edge is greater than the edge roundness of the first trailing cutting edge.

5. The threading insert according to claim 1, wherein in a top view, the first leading cutting edge and the first trailing cutting edge converge toward the first top cutting edge, and wherein in the top view, the first leading cutting edge and/or the first trailing cutting edge is straight or substantially straight.

6. The threading insert according to claim 1, wherein in a top view, the threading insert extends beyond a sector limited by a first line coinciding with the first leading cutting edge and a second line coinciding with the first trailing cutting edge.

7. The threading insert according to claim 1, wherein in a top view the first top cutting edge is straight or substantially straight.

8. The threading insert according to claim 1, wherein the edge roundness of the first top cutting edge is greater than an edge roundness of the second top cutting edge.

9. The threading insert according to claim 1, wherein the edge roundness of the first leading cutting edge is greater than an edge roundness of the second leading cutting edge.

10. The threading insert according to claim 1, further comprising 1-5 intermediate teeth arranged between the first tooth and the second tooth, the intermediate teeth being arranged to cooperate with the first and second teeth for cutting a thread profile, wherein one intermediate tooth, adjacent to the first tooth, includes an intermediate top cutting edge, and wherein an edge roundness of said intermediate top cutting edge is greater than the edge roundness of the second top cutting edge.

11. A method to manufacture a threading insert according to claim 1, comprising the steps of:
    providing a threading insert blank having a first tooth, the first tooth including a first cutting edge, the first cutting edge including a first top cutting edge connecting a first leading cutting edge and a first trailing cutting edge;
    blasting the first cutting edge such that a beam having an abrasive medium is directed towards the first cutting edge; and
    altering at least one blasting parameter as the beam moves along the first cutting edge.

12. A method to manufacture a threading insert according to claim 1, comprising the steps of:
    providing a threading insert blank having a first tooth, the first tooth including a first cutting edge, the first cutting edge including a first top cutting edge connecting a first leading cutting edge and a first trailing cutting edge;
    removing material from the first cutting edge such that a laser beam is directed towards the first cutting edge; and
    altering at least one laser beam parameter as the laser beam moves along the first cutting edge.

13. A method to manufacture a thread profile comprising the steps of:
    providing a threading insert according to claim 1;
    providing a metal work piece;
    rotating the metal work piece around a rotational axis thereof; and
    moving the threading insert in a feed direction such that a first leading cutting edge is facing the feed direction.

14. The method according to claim 13, further comprising the steps of:
    selecting a threading insert that has a second tooth, the second tooth including a second cutting edge, the second cutting edge having a second top cutting edge connecting a second leading cutting edge and a second trailing cutting edge, wherein the second cutting edge has an edge roundness, the second tooth being arranged to cooperate with the first tooth for cutting a thread profile, a size of the first tooth being smaller than a size of the second tooth, wherein the first trailing cutting edge faces the second leading cutting edge; and manufacturing the thread profile such that a final shape of the thread profile is achieved by the second cutting edge.

15. The method according to claim 13, further comprising the step of machining the thread form via multiple passes through a modified flank infeed operation.

16. A threading insert comprising:
a top surface, an opposite bottom surface, and a side surface connecting the top surface and the bottom surface;
a first tooth, the first tooth including a first cutting edge, the first cutting edge having a first top cutting edge connecting a first leading cutting edge and a first trailing cutting edge, wherein the first cutting edge has an edge roundness, when seen in a cross-section in a plane perpendicular to the first cutting edge, and wherein a size of the edge roundness varies along the first cutting edge, wherein an edge roundness of the first leading cutting edge is greater than the edge roundness of the first trailing cutting edge; and
a second tooth, the second tooth including a second cutting edge, the second cutting edge having a second top cutting edge connecting a second leading cutting edge and a second trailing cutting edge, wherein the second cutting edge has an edge roundness, the second tooth being arranged to cooperate with the first tooth for cutting a thread profile, a size of the first tooth being smaller than a size of the second tooth, wherein the first trailing cutting edge faces the second leading cutting edge.

17. The threading insert according to claim 16, wherein an edge roundness of the first top edge is greater than an edge roundness of the first trailing cutting edge.

* * * * *